United States Patent
Yum et al.

(10) Patent No.: US 10,637,629 B2
(45) Date of Patent: Apr. 28, 2020

(54) METHOD AND APPARATUS FOR TRANSMITTING UPLINK SIGNAL IN WIRELESS COMMUNICATION SYSTEM

(71) Applicant: LG ELECTRONICS INC., Seoul (KR)

(72) Inventors: Kunil Yum, Seoul (KR); Yunjung Yi, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 15/192,331

(22) Filed: Jun. 24, 2016

(65) Prior Publication Data

US 2016/0380740 A1 Dec. 29, 2016

Related U.S. Application Data

(60) Provisional application No. 62/184,267, filed on Jun. 25, 2015.

(51) Int. Cl.
  *H04L 5/00* (2006.01)
  *H04L 1/18* (2006.01)

(52) U.S. Cl.
  CPC .......... *H04L 5/0055* (2013.01); *H04L 1/1861* (2013.01); *H04L 5/0048* (2013.01)

(58) Field of Classification Search
  None
  See application file for complete search history.

(56) References Cited

U.S. PATENT DOCUMENTS

| | | | | |
|---|---|---|---|---|
| 2007/0150788 A1* | 6/2007 | Zhuyan | ................. | H04L 1/0071 714/749 |
| 2011/0268053 A1* | 11/2011 | Che | ........................ | H04L 1/1621 370/329 |
| 2012/0093073 A1* | 4/2012 | Lunttila | ................ | H04L 1/1607 370/328 |
| 2014/0056187 A1* | 2/2014 | Papasakellariou | .... | H04L 1/1614 370/280 |
| 2014/0169242 A1* | 6/2014 | Yang | ......................... | H04L 1/18 370/280 |
| 2018/0034610 A1* | 2/2018 | He | ......................... | H04L 1/1861 |

OTHER PUBLICATIONS

3GPP TR45.820 v1.3.1 (Jun. 2015) Cellular System Support for Ultra Low Complexity and Low Throughput Internet of Things. Downloadable from http://portal.3gpp.org.*

* cited by examiner

*Primary Examiner* — Jeffrey M Rutkowski
*Assistant Examiner* — Basil Ma
(74) *Attorney, Agent, or Firm* — Birch, Stewart, Kolasch & Birch, LLP

(57) ABSTRACT

A method for transmitting an acknowledgement (ACK)-related information in a method for transmitting uplink control information in a wireless communication system includes: designating specific symbols in a resource allocation unit for ACK/NACK (acknowledgement/negative-acknowledgement) transmission within an uplink data channel; dividing the resource allocation unit into a plurality of symbol regions; sequentially mapping ACK/NACK bits to the plurality of symbol regions; and transmitting the uplink data channel to which the ACK/NACK bits are mapped, wherein the mapping includes mapping contiguous bits of the ACK/NACK bits to different symbol regions of the plurality of symbol regions.

14 Claims, 15 Drawing Sheets

☐ : Pilot    ☐ : Data    ▨ : ACK/NACK

METHOD AND APPARATUS FOR TRANSMITTING UPLINK SIGNAL IN WIRELESS COMMUNICATION SYSTEM

CROSS-REFERENCE TO RELATED APPLICATIONS

This application claims the benefit of the U.S. Provisional Application No. 62/184,267, filed on Jun. 25, 2015, which is hereby incorporated by reference as if fully set forth herein.

BACKGROUND OF THE INVENTION

Field of the Invention

The present invention relates to a wireless communication system, and more particularly to a method and apparatus for transmitting an uplink signal.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method and apparatus for transmitting an uplink signal in a wireless communication system that substantially obviates one or more problems due to limitations and disadvantages of the related art.

An object of the present invention is to provide a method for transmitting an uplink signal.

Another object of the present invention is to provide a method for establishing resources to transmit an acknowledgement (ACK) signal for a Cellular IoT (Internet of Things) (CIoT) user equipment (UE), and an operation for allocating ACK transmission in the corresponding resources.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting an acknowledgement (ACK)—related information in a method for transmitting uplink control information in a wireless communication system including: designating specific symbols in a resource allocation unit for ACK/NACK (acknowledgement/negative-acknowledgement) transmission within an uplink data channel; dividing the resource allocation unit into a plurality of symbol regions; sequentially mapping ACK/NACK bits to the plurality of symbol regions; and transmitting the uplink data channel to which the ACK/NACK bits are mapped, wherein the mapping includes mapping contiguous bits of the ACK/NACK bits to different symbol regions of the plurality of symbol region.

Additionally or alternatively, each of the plurality of symbol regions may be configured to include symbols for successive ACK/NACK transmission.

Additionally or alternatively, the resource allocation unit may be configured for each modulation scheme for the ACK/NACK transmission.

Additionally or alternatively, the resource allocation unit may be configured to include a predetermined number of symbols.

Additionally or alternatively, the resource allocation unit may be configured per scheduling unit defined for uplink data transmission.

Additionally or alternatively, the resource allocation unit may be predefined or is configured through a higher layer signaling.

Additionally or alternatively, the ACK/NACK bits may be sequentially mapped in the order from a symbol having the lowest index to a symbol having the highest index in each of the plurality of symbol regions, or may be sequentially mapped in the order from the earliest symbol to the last symbol on a time domain in each of the plurality of symbol regions.

Additionally or alternatively, the specific symbols may be dedicated resources for the ACK/NACK transmission.

Additionally or alternatively, at least one of the specific symbols may be designated to be adjacent to a symbol to which a pilot signal is mapped.

In accordance with another aspect of the present invention, a CIoT (cellular—Internet of Things) user equipment (UE) configured to transmit uplink control information in a wireless communication system includes: a transmitter and a receiver; and a processor configured to control the transmitter and the receiver, wherein the processor designates specific symbols in a resource allocation unit for ACK/NACK (acknowledgement/negative-acknowledgement) transmission within an uplink data channel, divides the resource allocation unit into a plurality of symbol regions, sequentially maps ACK/NACK bits to the plurality of symbol regions, and transmits the uplink data channel to which the ACK/NACK bits are mapped, wherein the mapping includes mapping contiguous bits of the ACK/NACK bits to different symbol regions.

Additionally or alternatively, each of the plurality of symbol regions may configured to include symbols for successive ACK/NACK transmission.

Additionally or alternatively, the resource allocation unit may be configured for each modulation scheme for the ACK/NACK transmission.

Additionally or alternatively, the resource allocation unit may be configured to include a predetermined number of symbols.

Additionally or alternatively, the resource allocation unit may be configured per scheduling unit defined for uplink data transmission.

Additionally or alternatively, the resource allocation unit may be predefined or may be configured through a higher layer signaling.

Additionally or alternatively, the ACK/NACK bits may be sequentially mapped in the order from a symbol having the lowest index to a symbol having the highest index in each of the plurality of symbol regions, or may be sequentially mapped in the order from the earliest symbol to the last symbol on a time domain in each of the plurality of symbol regions.

Additionally or alternatively, the specific symbols may be dedicated resources for the ACK/NACK transmission.

Additionally or alternatively, at least one of the specific symbols may be designated to be adjacent to a symbol to which a pilot signal is mapped.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
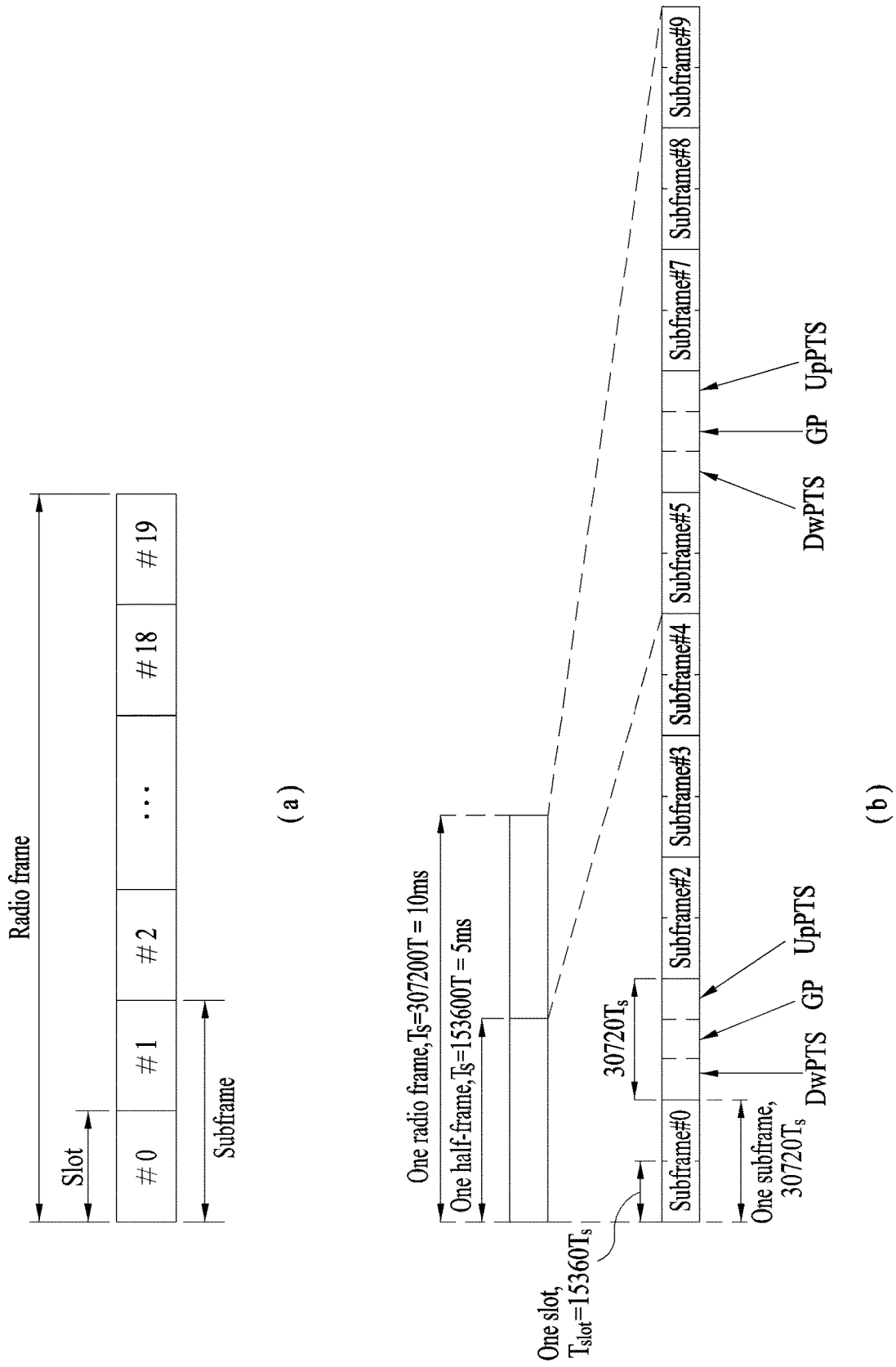
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals)

transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
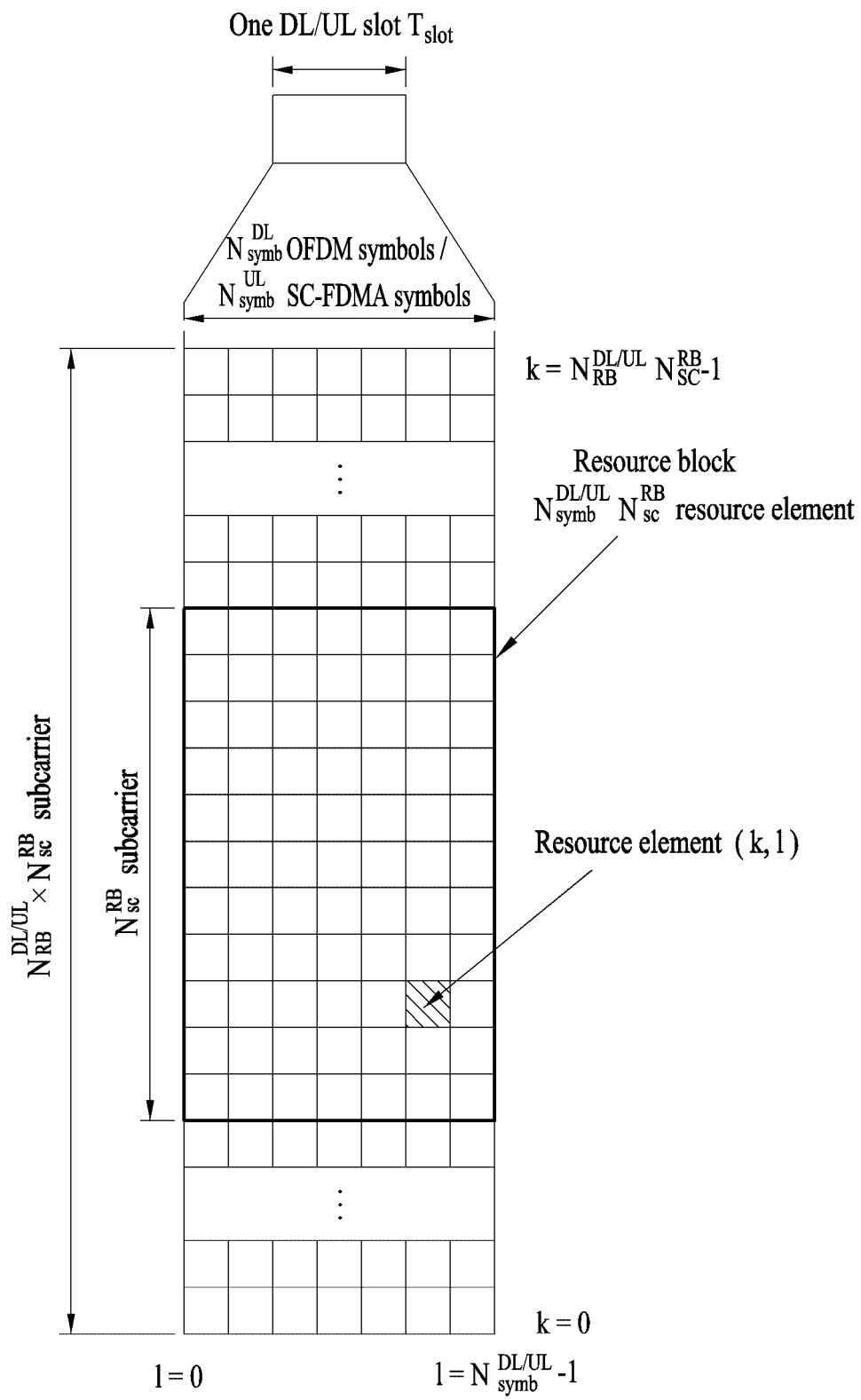
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$ and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
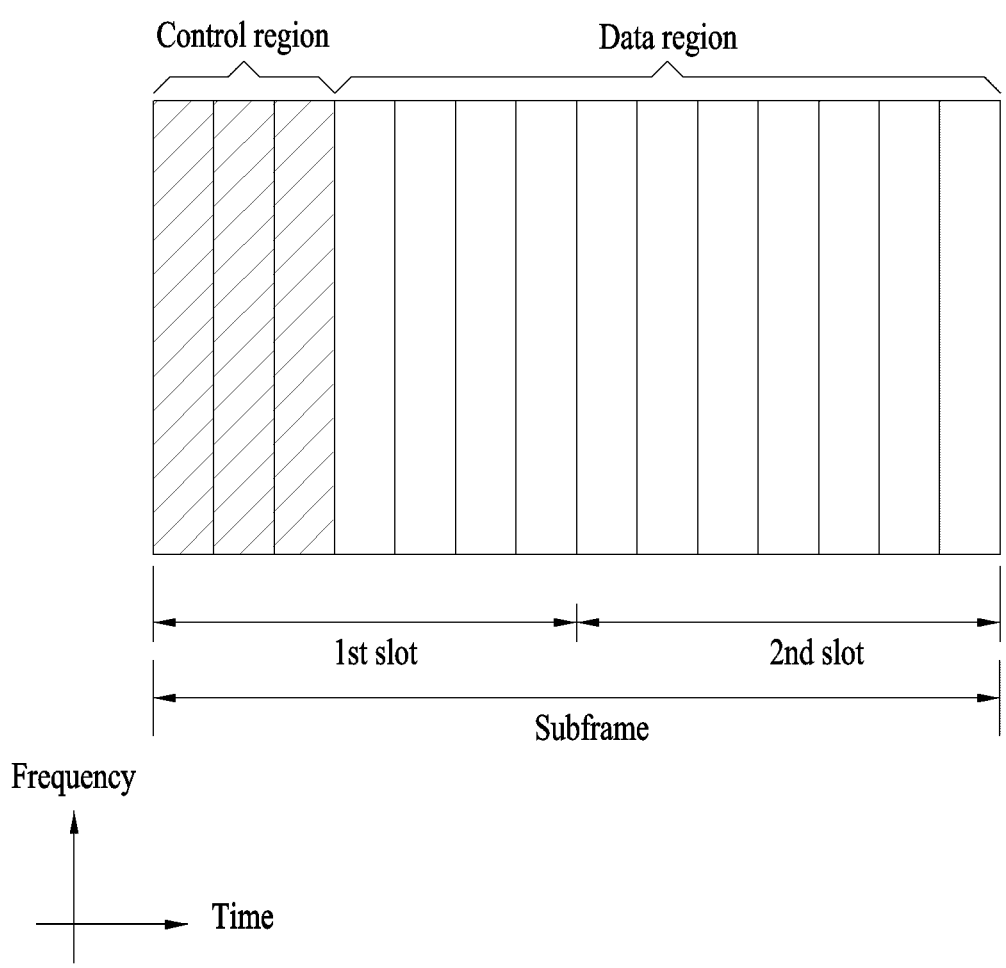
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
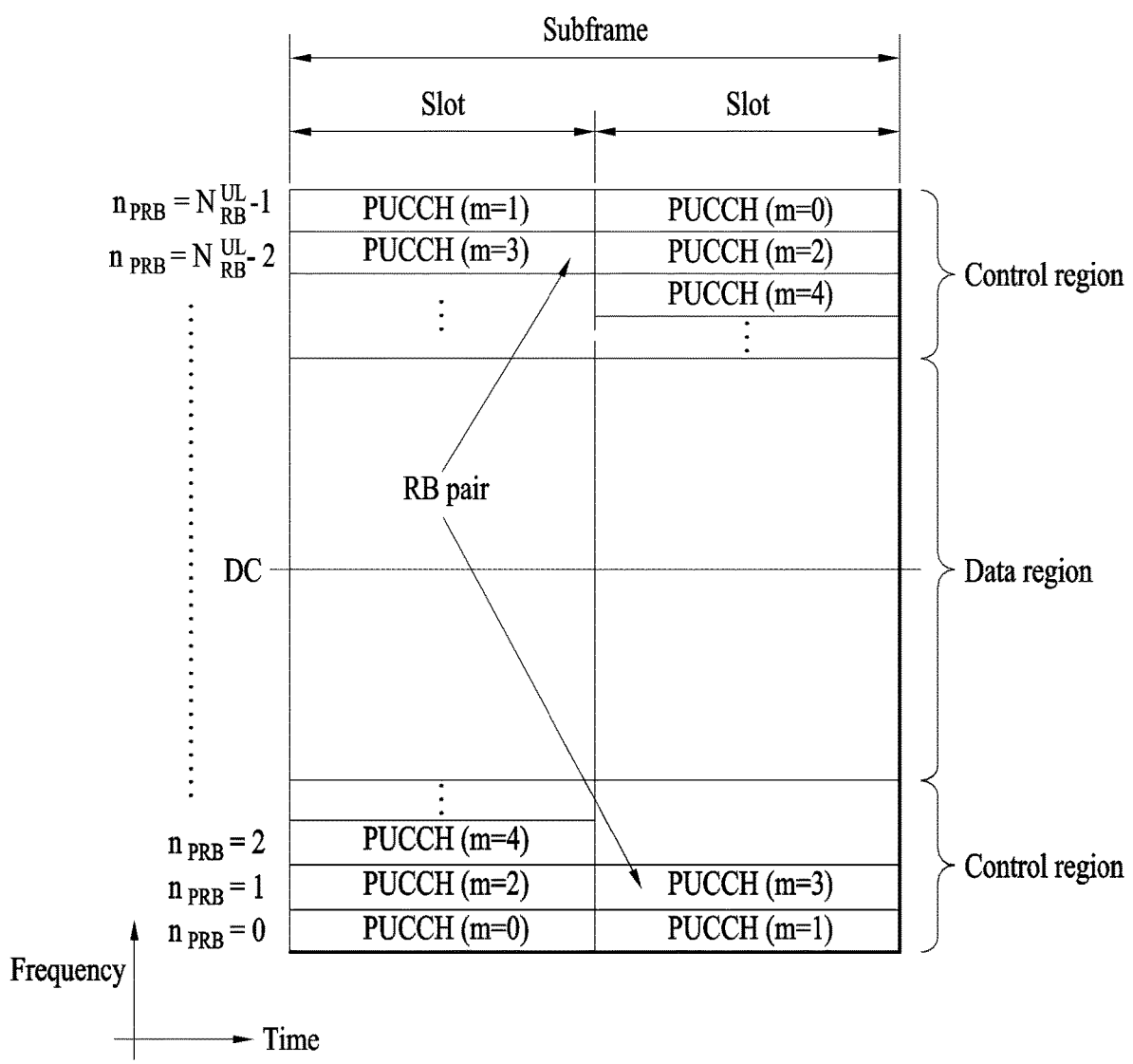
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In next-generation systems such as GERAN (GSM EDGE Radio Access Network), constructing a UE of low cost/low specification which mainly performs data communication for, for example, reading of a meter, measurement of water level, utilization of a surveillance camera, stock report about a vending machine, and the like is considered. Such a network is called Internet-of-Things (IoT). In particular, IoT implemented over cellular networks is referred to as CIoT. In the GERAN, a method of supporting CIoT UEs using a standard independent from the legacy GERAN is considered as a clean-slate approach.

Specifically, in the clean-slate CIoT, as a method for transmitting specific information indicating whether acknowledgement (ACK) of downlink (DL) data is achieved, ACK/NACK corresponding to physical layer signaling may be used. Under the condition that an independent dedicated UL control channel is not defined, a method for transmitting ACK/NACK through UL resources is needed. Therefore, the corresponding ACK/NACK information may be piggybacked on a PUSCH channel for transmitting UL data, and may then be transmitted. Under the above-mentioned situation, the present invention proposes a resource establishing method and a data mapping method for allowing the CIoT UE to piggyback ACK/NACK for DL data on a data channel and to transmit the piggybacked result through a data channel.

In the clean-slate CIoT, the UL pilot signal may be classified into two kinds of uplink pilot signals according to a modulation scheme.

Phase Shift Keying (PSK) modulation: 2 pilot symbols for every 8 data symbols

Figure 5:
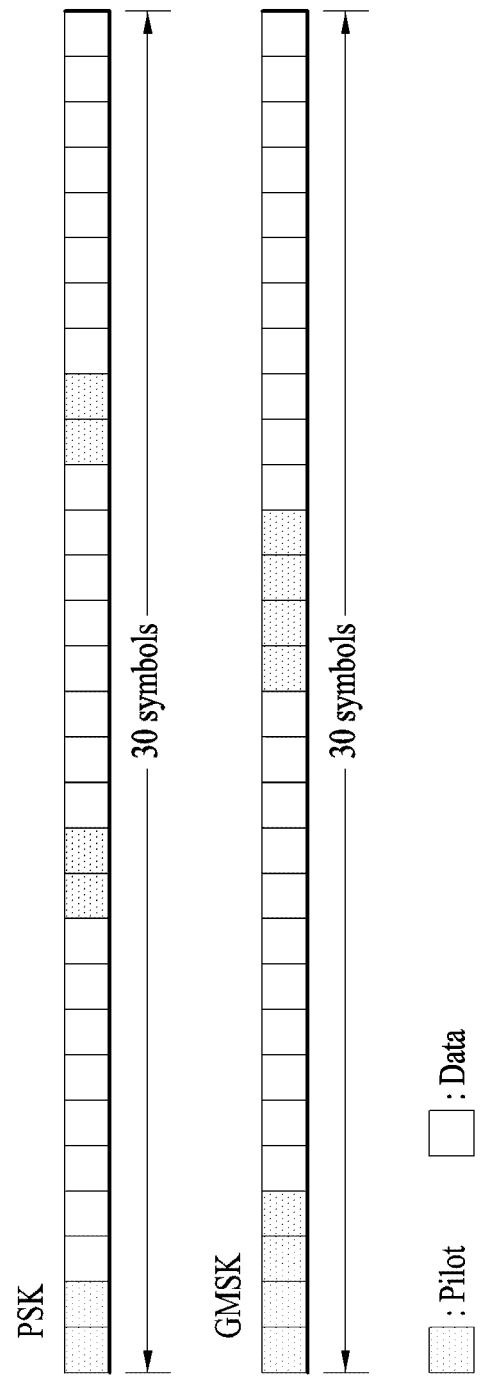
FIG. 5 is a conceptual diagram illustrating an uplink pilot (signal) structure for GSM EDGE Radio Access Network (GERAN) CIoT.

Gaussian Minimum Shift Keying (GMSK) modulation: 4 pilot symbols for every 11 data symbols As shown in FIG. 5, in PSK, a pilot pattern is repeated in units of 10 symbols. In GMSK, a pilot pattern is repeated in units of 15 symbols. FIG. 5 exemplarily shows 30 symbol-regions that indicate a minimum repetition unit capable of being commonly used in two cases of PSK and GMSK.

A CIoT uplink (UL) structure may be used to bond of UL frequencies such that a transfer rate of the UE is increased. In this case, for scheduling of UL data, a method for defining different scheduling units having different symbol rates in units of 150 symbols is used.

No bonding (bonding factor=1): 8 slots (40 ms, 150 symbols)

2-channel bonding (bonding factor=2): 4 slots (20 ms, 150 symbols)

4-channel or 8-channel bonding (bonding factor=4 or 8): (10 ms, bonding factor=150 symbols for 4) or (bonding factor=300 symbols for 8)

ACK/NACK Resource Position in PUSCH

When ACK/NACK is transmitted, the corresponding information is transmitted over a PUSCH. In this case, a specific region of PUSCH is designated and transmitted, such that ACK/NACK can be more stably transmitted. The corresponding information may be dedicated resources of ACK/NACK, or may be general data resources. A difference in the two resources is as follows.

Dedicated resources may be reserved, such that the dedicated resources may be used only for ACK/NACK transmission and may not be used for data transmission.

Data resources are not reserved for ACK/NACK transmission, resources needed for ACK/NACK transmission are punctured after completion of data mapping, such that ACK/NACK is transmitted to the corresponding resources.

Although the resources are exemplarily disclosed as dedicated resources for convenience of description, it may also be possible to use another method for transmitting ACK/NACK in which resources are not reserved in advance, pre-allocated data is punctured according to resources and the order of mapping to be described later, and ACK/NACK is then transmitted.

Figure 6:
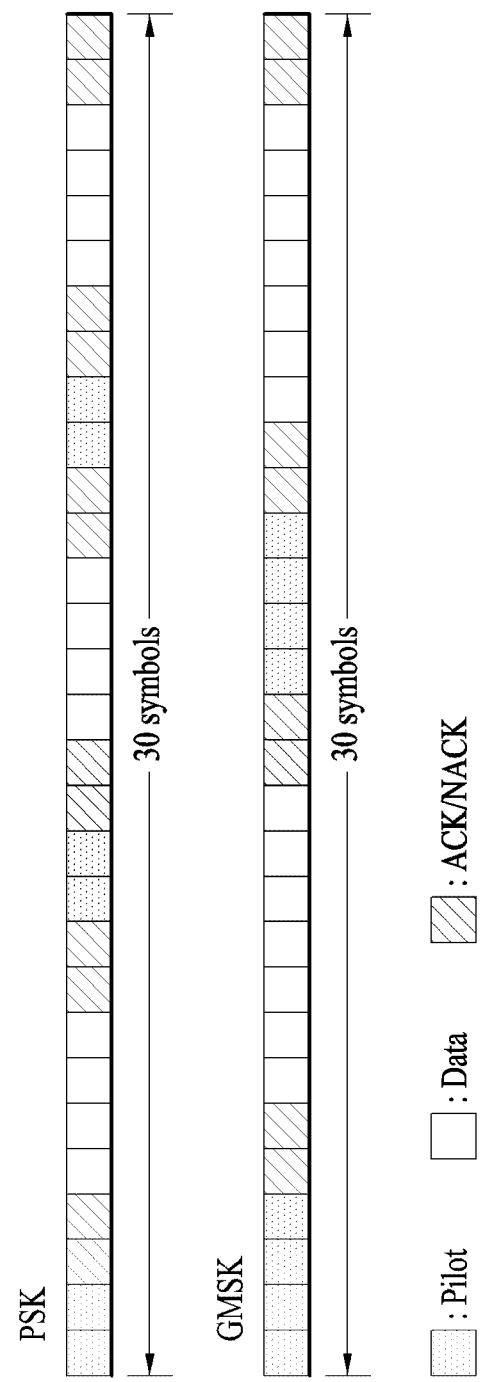
FIG. 6 is a conceptual diagram illustrating an exemplary method for allocating ACK transmission resources according to an embodiment of the present invention.

When ACK/NACK is transmitted over PUSCH, the corresponding ACK/NACK may be transmitted through ACK/NACK resources defined in PUSCH. In this case, ACK/NACK may be used as information for indicating integrity of DL transmission, such that the operation for transmitting ACK/NACK at a low probability of causing errors is of importance to overall transmission efficiency improvement. Therefore, assuming that ACK/NACK is located close to the pilot (signal) of the above-mentioned structure, the lowest probability of causing errors caused by channel measurement of the pilot (signal) may be expected. That is, resources for ACK/NACK transmission may be established in resources located close to the pilot (signal), and ACK/NACK may be allocated to the corresponding resources. For example, it may be possible to establish resources as shown in FIG. 6.

PUSCH of CIoT may be transmitted using a single tone. In this case, ACK/NACK transmission may be different from the legacy LTE ACK/NACK transmission. Specifically, the amount of ACK/NACK resources for CIoT is less than that of the legacy LTE, and much more symbols than the legacy LTE may be used for ACK/NACK transmission of a UE so as to guarantee a low coding rate for less errors. FIG. 6 exemplarily shows that ACK/NACK is transmitted in two symbols adjacent to the pilot (signal). 30 symbol structures of FIG. 6 may be repeated 5 times, such that 8 slots (40 ms, 150 symbols) for a scheduling unit at "bonding factor=1" may be achieved.

Figure 7:
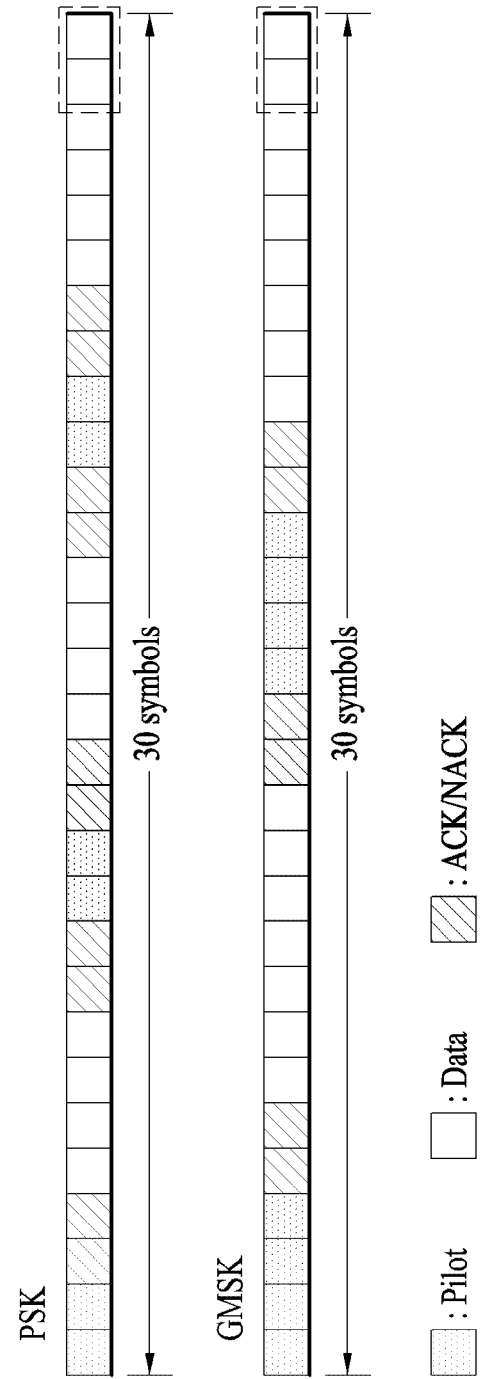
FIG. 7 is a conceptual diagram illustrating an exemplary method for allocating ACK transmission resources according to an embodiment of the present invention.

In the above-mentioned example, the position of ACK/NACK located at the last position of the scheduling unit (e.g., 8 slots) may not be used according to whether or not the next scheduling unit is transmitted as shown in FIG. 7, or may not be used irrespective of transmission or non-transmission of the next scheduling unit.

Since the pilot (signal) may not be transmitted due to the absence of the next scheduling, it may be impossible to use correct channel information through the pilot (signal) because the operation for transmitting ACK/NACK to the corresponding resource may be incorrect.

Figure 8:
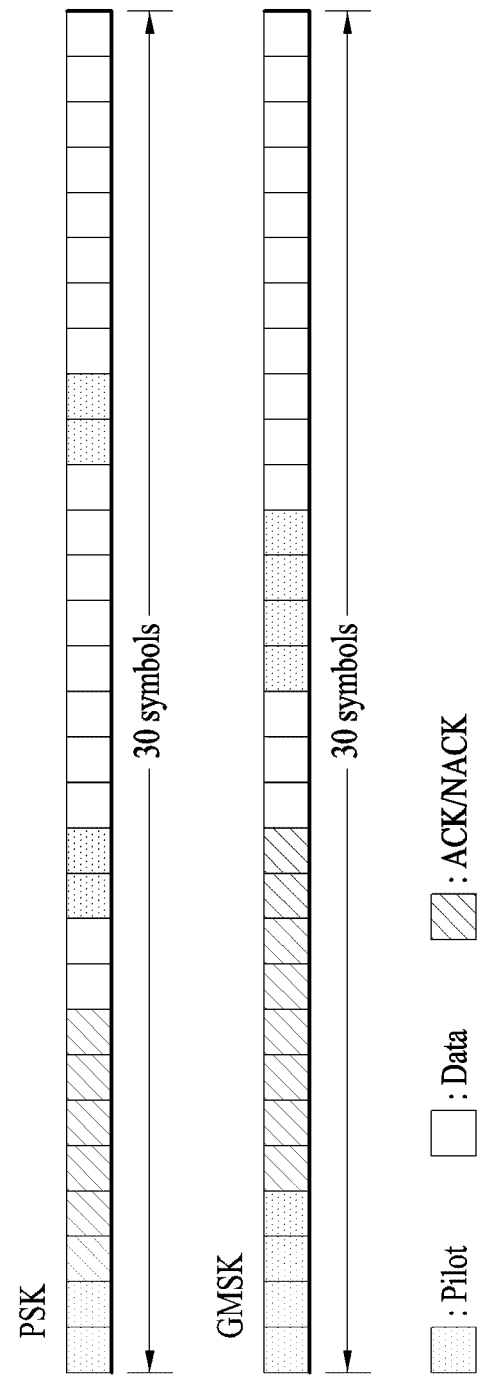
FIG. 8 is a conceptual diagram illustrating an exemplary method for allocating ACK transmission resources according to an embodiment of the present invention.

Alternatively, as shown in FIG. 8, a specific bursty data region may be used for ACK/NACK transmission, irrespective of the position of the pilot (signal).

The structure of 30 symbols shown in FIG. 8 is repeated 5 times, such that 8 slots (40 ms, 150 symbols) for a scheduling unit at "bonding factor=1" may be achieved.

In the above-mentioned example, the ACK/NACK position may be extended or reduced according to the size of ACK/NACK to be transmitted. Specifically, the region for ACK/NACK transmission may also include the entirety of the data region of PUSCH as necessary. The size and/or position of the ACK/NACK transmission region may be predefined, or may be established by higher layer signaling such as RRC signaling.

ACK/NACK Mapping in PUSCH A Resources

A method for arranging ACK/NACK in the above-mentioned ACK/NACK resources will hereinafter be described. It may be possible to use the following method.

Sequential Allocation

Figure 9:
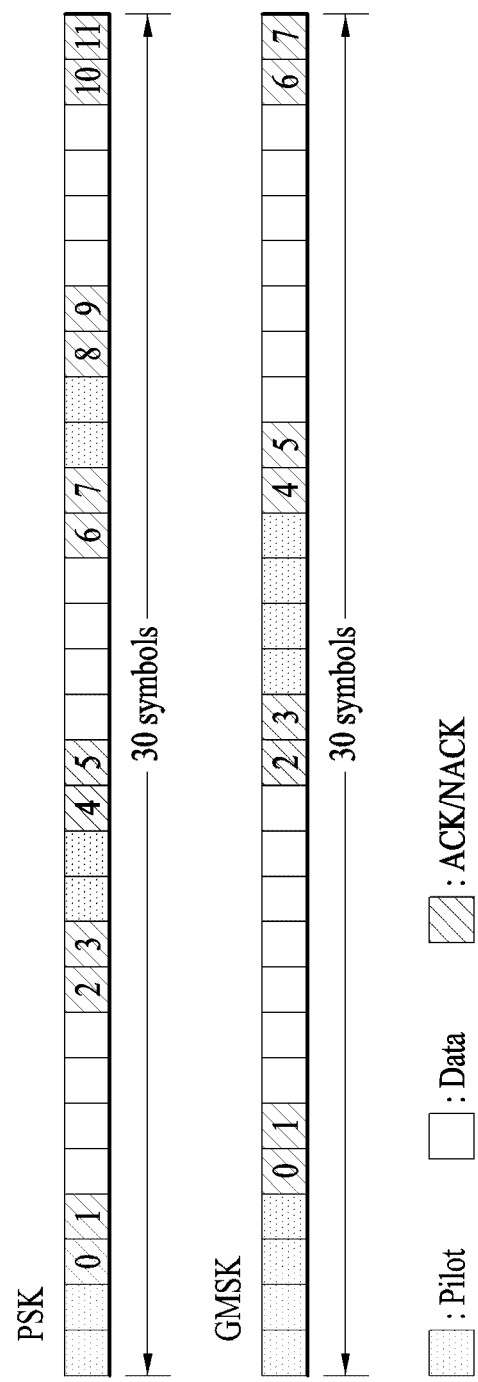
FIG. 9 is a conceptual diagram illustrating acknowledgment/negative-acknowledgment (ACK/NACK) bit mapping in ACK transmission resources according to an embodiment of the present invention.

ACK/NACK may be sequentially mapped in ascending numerical order of resource (e.g., symbol) indexes or ACK/NACK may be sequentially mapped in the order from initial resources corresponding to the earliest time to the last resources corresponding to the latest time. The UE may sequentially read and interpret resources arranged in ascending numerical order of resource indexes. FIG. 9 shows that ACK/NACK can be mapped in ascending order of the symbol index to a total of 12 symbols indexed from 0 to 11 in the case of PSK in a resource region composed of 30 symbols, and ACK/NACK can be mapped in ascending order of the symbol index to a total of 8 symbols indexed from 0 to 7 in the case of GSMK in a resource region composed of 30 symbols. Further, the numerals in FIGS. 9-13 indicate the order of mapping. That is, the ACK/NACK can be sequentially mapped to the symbols in ascending order of the numerals. Although the simplest operation is possible, the sequential allocation is vulnerable to bursty errors.

Interleaved Allocation

A predetermined pattern in which the mapping order is interleaved is defined, and the corresponding pattern is repeated, such that ACK/NACK may be mapped or allocated. For example, ACK/NACK may be mapped in the order of 0→2→1→3, instead of in the order of 0→1→2→3. ACK/NACK may be mapped or allocated according to the predefined pattern. Specifically, the method for primarily allocating ACK/NACK to symbols located adjacent to the pilot (signal) may be used. In this case, although the interleaved allocation scheme is more robust against the bursty errors than the above-mentioned sequential allocation, the possibility that symbols (e.g., 0 and 2) relatively adjacent to each other may be lost may still remain.

Mirroring

Figure 10:
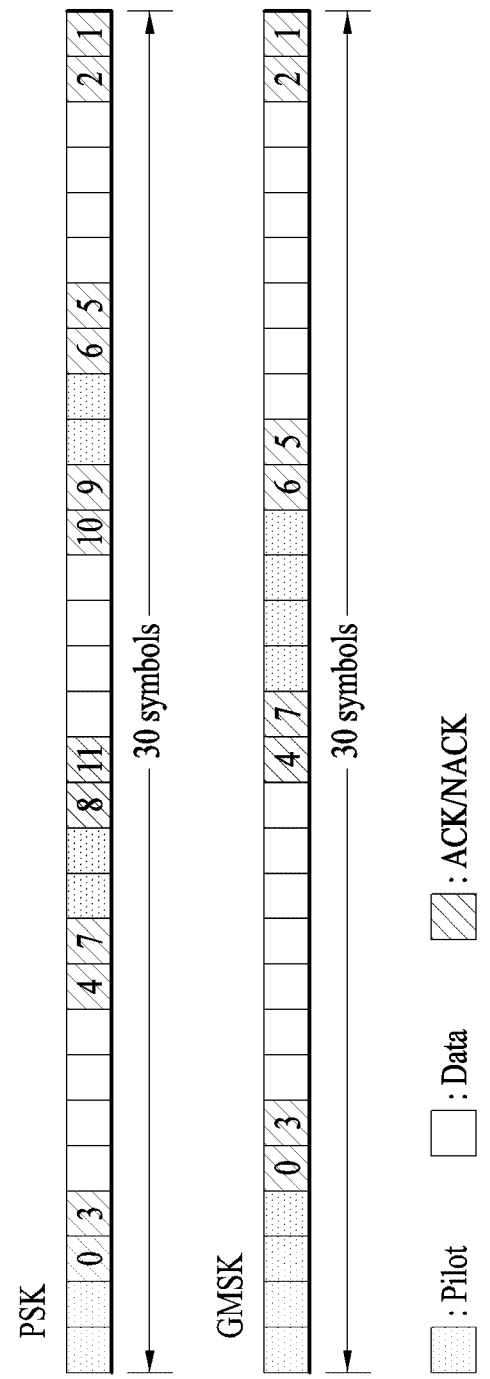
FIG. 10 is a conceptual diagram illustrating ACK/NACK bit mapping in ACK transmission resources according to an embodiment of the present invention.
Figure 11:
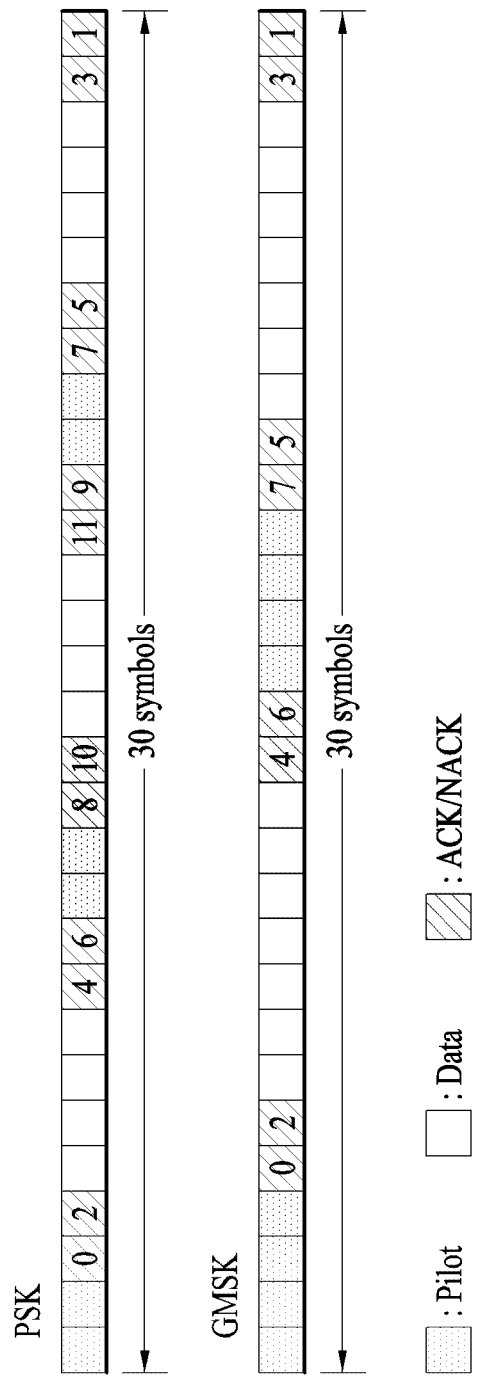
FIG. 11 is a conceptual diagram illustrating ACK/NACK bit mapping in ACK transmission resources according to an embodiment of the present invention.

In order to minimize influence of bursty errors, ACK/NACK bits adjacent to each other are located farthest from the resource region in the direction of time, and then allocated. A constant operation unit is designated, and a contiguous bit is mapped at the farthest position in the operation unit. FIGS. 10 and 11 illustrate the mirroring scheme when the operation unit is comprised of 30 symbols. In this case, the former symbols (e.g., 0 to 3) for ACK/NACK may have the highest error avoidance performance, and the latter symbols (e.g., 8 to 11) may have the restrictive avoidance function.

In FIG. 10, the mapping scheme for use in the legacy LTE may be partially reused. That is, the mapping scheme in which 4 HARQ ACK/NACK REs for use in the legacy LTE PUSCH may be mapped to the $2^{nd}$ symbol, the $9^{th}$ symbol, the $8^{th}$ symbol, and the $3^{rd}$ symbol may be applied to symbols #0~#3, symbols #4~#7, and symbols #8~#11.

However, the above-mentioned method may have the possibility that errors are simultaneously applied to contiguous ACK/NACK symbols (#1 to #2, or #5 to #6), such that the method shown in FIG. 11 may be used. Contiguous ACK/NACK bits are not mapped to contiguous symbols according to the example of FIG. 11.

Separation

Figure 12:
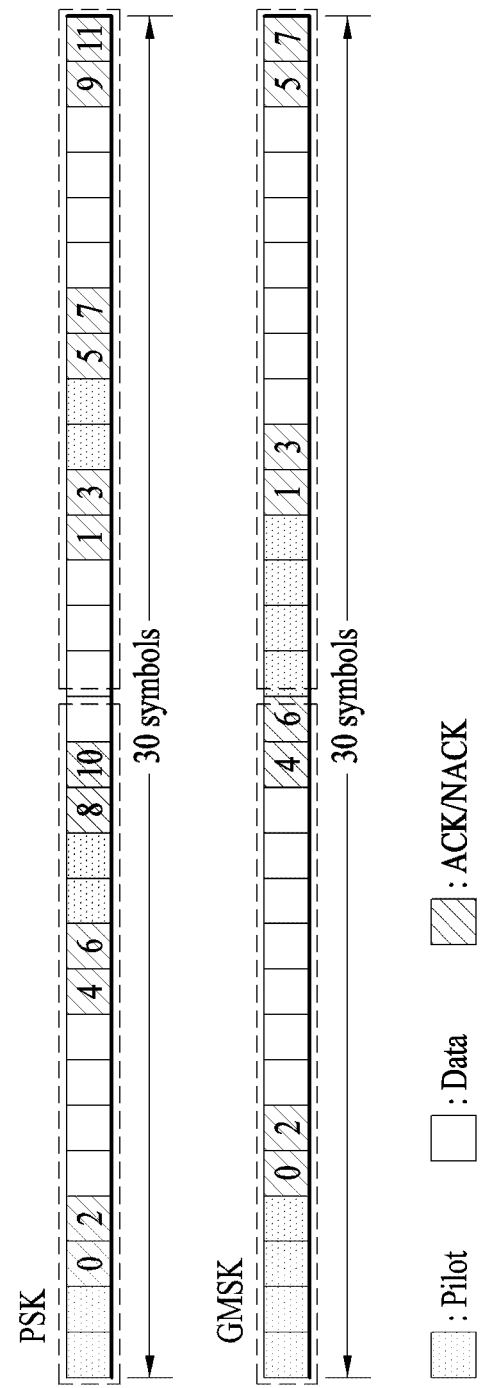
FIG. 12 is a conceptual diagram illustrating ACK/NACK bit mapping in ACK transmission resources according to an embodiment of the present invention.

In order to allow contiguous ACK/NACK bits to be located farthest from each other so as to implement the same purpose as in the above-mentioned mirroring, a region is divided into a plurality of regions according to specific operation units, and contiguous ACK/NACK bits are allocated to different regions. Basically, ACK/NACK bits may be sequentially allocated in ascending numerical order of symbol indexes for ACK/NACK transmission. For example, two regions may be established in the operation units of 30 symbols as shown in FIG. 12, the odd ACK/NACK or the even ACK/NACK may be mapped to each region. Since the distance between the ACK/NACK symbols may be uniformly maintained, that the same burst error avoidance effect for all symbols may be expected as compared to the above-mentioned mirroring scheme.

Figure 13:
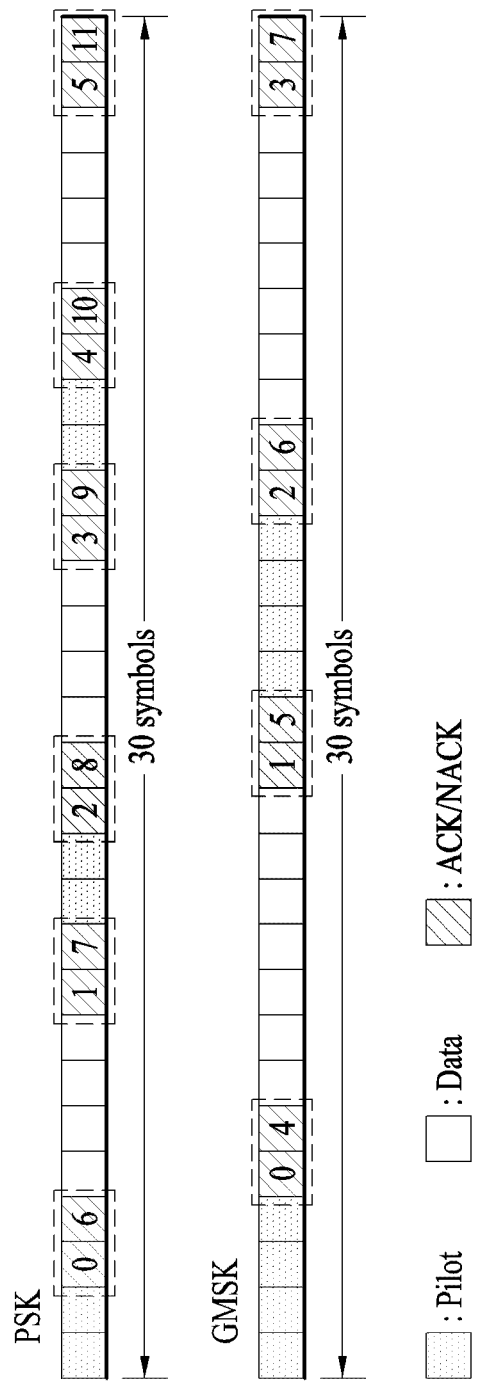
FIG. 13 is a conceptual diagram illustrating ACK/NACK bit mapping in ACK transmission resources according to an embodiment of the present invention.

Alternatively, as shown in FIG. 13, contiguous ACK/NACK resources are combined or tied up as shown in FIG. 13, such that necessary regions may be established.

The above-mentioned mirroring or separation method may be operated in different ways according to the operation units proposed by the present invention.

ACK/NACK mapping according to a repetition unit for each modulation scheme

Different mapping units are allocated to respective modulation schemes, and ACK/NACK may be mapped according to a minimum repetition unit for each modulation scheme ACK/NACK may be mapped in a minimum repetition unit (e.g., 10 symbols for PSK, 15 symbols for GMSK) for each modulation scheme.

ACK/NACK mapping in units of 30 symbols 30 symbols may be a unit capable of being repeated in two modulation schemes, ACK/NACK mapping may be achieved in units of the corresponding operation. FIGS. 10 to 13 illustrate examples for the above method.

ACK/NACK mapping on the basis of a scheduling unit

The above-mentioned method may be applied on the basis of the scheduling unit (e.g., 8 slots in which no channel bonding is present).

ACK/NACK mapping on the basis of a predefined unit

ACK/NACK mapping may be predefined, or ACK/NACK may be mapped in units of a specific unit established by higher layer signaling or the like.

The above-mentioned mapping methods may also be applied to the bursty resource establishment without change. Although the above-mentioned method has already been disclosed for CIoT, single tone transmission such as NB-IoT considered in LTE may also be applied to all communication methods used in uplink.

Figure 14:
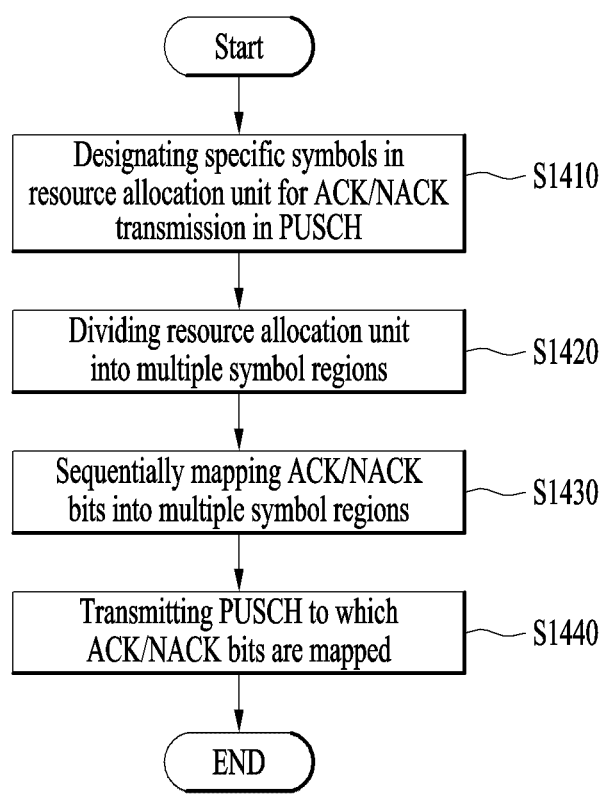
FIG. 14 exemplarily shows UE operations according to an embodiment of the present invention.

FIG. 14 exemplarily shows UE operations according to an embodiment of the present invention.

FIG. 14 is a flowchart illustrating a method for transmitting UL control information in a wireless communication system, and the above-mentioned method may be carried out by CIoT (Cellular—IoT (Internet of things)).

Referring to FIG. 14, the UE may designate specific symbols within a resource allocation unit for ACK/NACK transmission within the UL data channel (S1410). The UE may divide the resource allocation unit into a plurality of symbol regions (S1420).

Thereafter, the UE may sequentially map ACK/NACK bits into the plurality of symbol regions (S1430). The UE may transmit the UL data channel mapped to the ACK/NACK bits (S1440). Contiguous bits from among the above ACK/NACK bits may be mapped to different symbol regions.

Each of the plurality of symbol regions may include contiguous symbols for ACK/NACK transmission, the resource allocation unit may be established according to the respective modulation schemes for ACK/NACK transmission, or the resource allocation unit may be designated as a specific number of symbols.

Alternatively, the resource allocation unit may be established according to a scheduling unit defined for UL data transmission, and the resource allocation unit may be predefined, or may be established through higher layer signaling.

In addition, according to the mapping of ACK/NACK bits, ACK/NACK bits may be mapped in the respective symbol regions in ascending numerical order of symbol indexes or in ascending numerical order of time.

In addition, the specific symbols may be resources dedicated for the ACK/NACK transmission. At least one of the specific symbols may be located adjacent to a symbol to which the pilot signal is mapped.

Although the embodiments of the present invention have been briefly disclosed with reference to FIG. 14 for convenience of description, the embodiment of FIG. 14 may alternatively or additionally include at least some parts of the above-mentioned embodiment(s).

Figure 15:
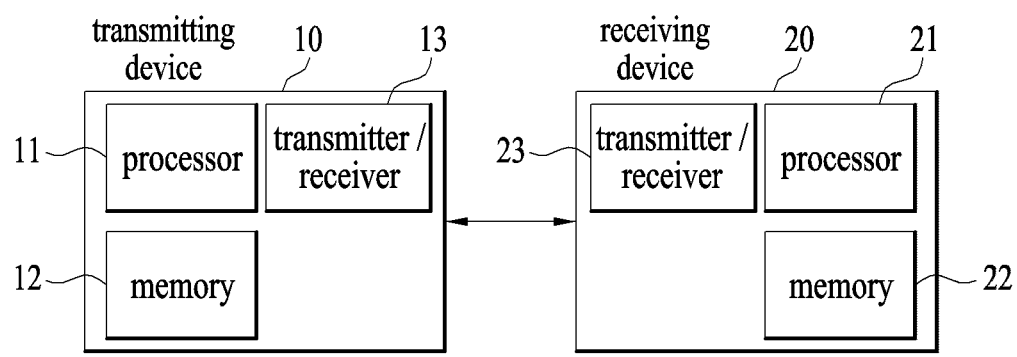
FIG. 15 is a block diagram illustrating a device for implementing embodiment(s) of the present invention.

FIG. 15 is a block diagram of a transmitting device 10 and a receiving device 20 configured to implement exemplary embodiments of the present invention. Referring to FIG. 15, the transmitting device 10 and the receiving device 20 respectively include transmitter/receivers 13 and 23 for transmitting and receiving radio signals carrying information, data, signals, and/or messages, memories 12 and 22 for storing information related to communication in a wireless communication system, and processors 11 and 21 connected operationally to the transmitter/receivers 13 and 23 and the memories 12 and 22 and configured to control the memories 12 and 22 and/or the transmitter/receivers 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receivers 13 and 23 include one or more antennas. An antenna performs a function of transmitting signals processed by the transmitter/receivers 13 and 23 to the exterior or receiving radio signals from the exterior to transfer the radio signals to the transmitter/receivers 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting uplink control information by a cellular-internet of things (CIoT) user equipment (UE) in a wireless communication system, the method comprising:

designating multiple symbols in each of multiple regions for acknowledgement/negative-acknowledgement (ACK/NACK) transmission on an uplink data channel, wherein the multiple symbols for ACK/NACK transmission are located adjacent to a symbol to which a pilot signal is mapped and each of the multiple regions includes contiguous multiple symbols;

sequentially mapping ACK/NACK bits to the multiple symbols across the multiple regions in ascending numerical order of symbol indexes; and transmitting the uplink data channel to which the ACK/NACK bits are mapped, wherein a number of the multiple regions is two, wherein odd numbered ACK/NACK bits are mapped in a first region of the multiple regions and even numbered ACK/NACK bits are mapped in a second region of the multiple regions, wherein the multiple regions include symbols with index I, wherein when a phase shift keying (PSK) modulation scheme is used for the uplink data channel, the ACK/NACK bits are mapped as:

| I | Signal | Region |
|---|--------|--------|
| 0 | P | R1 |
| 1 | P | |
| 2 | $A_1$ | |
| 3 | $A_3$ | |
| ... | | |
| 8 | $A_5$ | |
| 9 | $A_7$ | |
| 10 | P | |
| 11 | P | |
| 12 | $A_9$ | |
| 13 | $A_{11}$ | |
| 14 | | |
| ... | | R2 |
| 18 | $A_2$ | |
| 19 | $A_4$ | |
| 20 | P | |
| 21 | P | |
| 22 | $A_6$ | |
| 23 | $A_8$ | |
| ... | | |
| 28 | $A_{10}$ | |
| 29 | $A_{12}$, | | wherein when a Gaussian minimum shift keying (GMSK) modulation scheme is used for the uplink data channel, the ACK/NACK bits are mapped as:

| I | Signal | Region |
|---|--------|--------|
| 0 | P | R1 |
| 1 | P | |
| 2 | P | |
| 3 | P | |
| 4 | $A_1$ | |
| 5 | $A_3$ | |
| ... | | |
| 13 | $A_5$ | |
| 14 | $A_7$ | |
| 15 | P | R2 |
| 16 | P | |
| 17 | P | |
| 18 | P | |
| 19 | $A_2$ | |
| 20 | $A_4$ | |
| ... | | |
| 28 | $A_6$ | |
| 29 | $A_8$, | | and
wherein I denotes an index of a symbol in the multiple regions, each symbol includes the pilot signal, the ACK/NACK bit or data, R1 denotes the first region, R2 denotes the second region, P denotes the pilot signal, and Ai (i=1, 2, ... 30, where i denotes a number of bits) denotes the ACK/NACK bits.

2. The method according to claim 1, wherein each of the multiple regions is configured to include symbols for successive ACK/NACK transmission.

3. The method according to claim 1, wherein the multiple regions are configured for each modulation scheme for the ACK/NACK transmission.

4. The method according to claim 1, wherein the multiple regions are configured to include a predetermined number of symbols.

5. The method according to claim 1, wherein the multiple regions are configured per scheduling unit defined for uplink data transmission.

6. The method according to claim 1, wherein the multiple regions are predefined or are configured through a higher layer signaling.

7. The method according to claim 1, wherein the multiple symbols are dedicated resources for the ACK/NACK transmission.

8. A cellular-internet of things (CIoT) user equipment (UE) configured to transmit uplink control information in a wireless communication system, the CIoT UE comprising:
a transmitter and a receiver; and
a processor configured to control the transmitter and the receiver,
wherein the processor is further configured to:
designate multiple symbols in each of multiple regions for acknowledgement/negative-acknowledgement (ACK/NACK) transmission on an uplink data channel,
wherein the multiple symbols for ACK/NACK transmission are located adjacent to a symbol to which a pilot signal is mapped and each of the multiple regions includes contiguous multiple symbols,
sequentially map ACK/NACK bits to the multiple symbols across the multiple regions in ascending numerical order of symbol indexes, and
control the transmitter to transmit the uplink data channel to which the ACK/NACK bits are mapped,
wherein a number of the multiple regions is two,
wherein odd numbered ACK/NACK bits are mapped in a first region of the multiple regions and even numbered ACK/NACK bits are mapped in a second region of the multiple regions,
wherein the multiple regions include symbols with index I,
wherein when a phase shift keying (PSK) modulation scheme is used for the uplink data channel, the ACK/NACK bits are mapped as:

| I | Signal | Region |
|---|--------|--------|
| 0 | P | R1 |
| 1 | P | |
| 2 | $A_1$ | |
| 3 | $A_3$ | |
| ... | | |
| 8 | $A_5$ | |
| 9 | $A_7$ | |
| 10 | P | |
| 11 | P | |
| 12 | $A_9$ | |
| 13 | $A_{11}$ | |
| 14 | | |
| ... | | R2 |
| 18 | $A_2$ | |
| 19 | $A_4$ | |
| 20 | P | |
| 21 | P | |
| 22 | $A_6$ | |
| 23 | $A_8$ | |
| ... | | |
| 28 | $A_{10}$ | |
| 29 | $A_{12}$, | | wherein when a Gaussian minimum shift keying (GMSK) modulation scheme is used for the uplink data channel, the ACK/NACK bits are mapped as:

| I | Signal | Region |
|---|--------|--------|
| 0 | P | R1 |
| 1 | P | |
| 2 | P | |
| 3 | P | |
| 4 | $A_1$ | |
| 5 | $A_3$ | |
| ... | | |
| 13 | $A_5$ | |
| 14 | $A_7$ | |
| 15 | P | R2 |
| 16 | P | |
| 17 | P | |
| 18 | P | |
| 19 | $A_2$ | |
| 20 | $A_4$ | |
| ... | | |
| 28 | $A_6$ | |
| 29 | $A_8$, | | and
wherein I denotes an index of a symbol in the multiple regions, each symbol includes the pilot signal, the ACK/NACK bit or data, R1 denotes the first region, R2 denotes the second region, P denotes the pilot signal, and Ai (i=1, 2, ... 30, where i denotes a number of bits) denotes the ACK/NACK bits.

9. The CIoT UE according to claim 8, wherein each of the multiple regions is configured to include symbols for successive ACK/NACK transmission.

10. The CIoT UE according to claim 8, wherein the multiple regions are configured for each modulation scheme for the ACK/NACK transmission.

11. The CIoT UE according to claim 8, wherein the multiple regions are configured to include a predetermined number of symbols.

12. The CIoT UE according to claim 8, wherein the multiple regions are configured per scheduling unit defined for uplink data transmission.

13. The CIoT UE according to claim 8, wherein the multiple regions are predefined or are configured through a higher layer signaling.

14. The CIoT UE according to claim 8, wherein the multiple symbols are dedicated resources for the ACK/NACK transmission.

* * * * *